(No Model.)

C. M. COLLINS.
POWER HAMMER.

No. 456,616. Patented July 28, 1891.

Witnesses:
J. B. McGinn.
N. G. Thompson

Inventor:
Charles M. Collins,
by Smith & Low
attys

UNITED STATES PATENT OFFICE.

CHARLES M. COLLINS, OF SOUTH BEND, INDIANA.

POWER-HAMMER.

SPECIFICATION forming part of Letters Patent No. 456,616, dated July 28, 1891.

Application filed October 9, 1890. Serial No. 367,618. (No model.)

*To all whom it may concern:*

Be it known that I, CHARLES M. COLLINS, of South Bend, in St. Joseph county, in the State of Indiana, have invented new and useful Improvements in Power-Hammers; and I do hereby declare that the following is a full and accurate description of the same, reference being had to the accompanying drawings, wherein—

Figure 1:
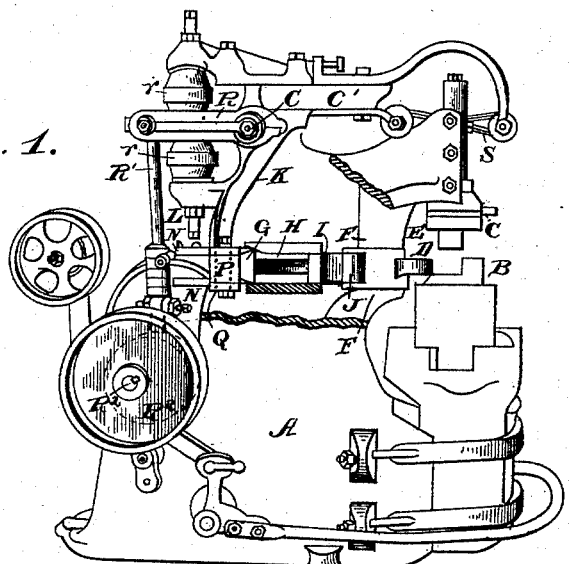
Figure 5:
Figure 3:
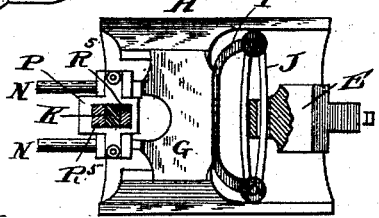
Figure 4:
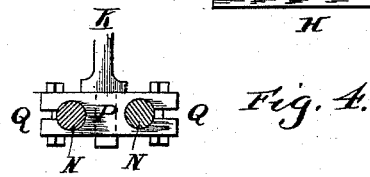
Figure 2:
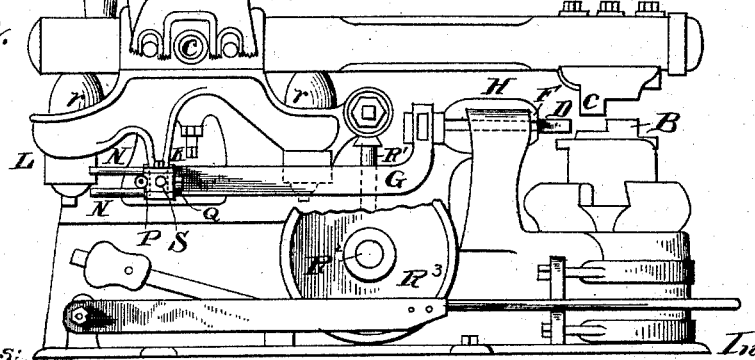

Figure 1 is a side elevation of an upright hammer of ordinary type having my improvement attached. Fig. 2 is a side elevation of a helve-hammer of ordinary type having my improvement attached. Fig. 3 is a plan of my supplemental hammer detached. Fig. 4 is an elevation of the coupling-head. Fig. 5 is a perspective view of an electric weld.

My invention has particular reference to use with apparatus for electric welding, though it will be apparent that its utility is not restricted to welds produced by electricity.

In welding bars by means of electricity the metal is first heated internally and most highly at the points of junction, the resistance being highest at that point. As is well known, also, the heated area does not extend far from the point of junction, and the mass of hot metal being small it loses temperature rapidly when the source of heat is withdrawn. When the adjacent surfaces have reached the welding temperature, they are strongly forced together to insure a welding contact of fibers, and this pressure causes the metal to spread at the point of contact and its reduction under the hammer becomes necessary. The heated area being small in comparison with the area heated in the smith's fire, the cooling is correspondingly rapid, and this interferes with the proper reduction under the ordinary hammer, because, the blows being delivered on one side only, it is necessary to turn the bar on the anvil. To avoid this turning and to economize time in the hammering, and thereby treat the weld more successfully, I have constructed my machine with two hammers acting in planes perpendicular to each other (or at some other angle, if preferred) and delivering their blows simultaneously or alternately, as desired.

I am aware that nail-forging machines have been constructed with four hammers operating in two planes perpendicular to each other; but that manifestly differs from my invention, inasmuch as a machine which actually delivers blows on four sides must necessarily be confined to operation upon bars of small size and to forging the ends. It would be difficult to arrange such a machine for operation upon welded joints or bars of considerable size.

That others may fully understand my invention, I will now describe more particularly the construction of my hammer, which I have employed for the purposes specified above.

A is the frame of an upright hammer of ordinary type.

C' is the main operating lever or helve, mounted on the axis $c$.

R is a frame mounted and oscillating upon the same axis and actuated by a connecting-rod R', which in turn is reciprocated by an eccentric in the ordinary manner, the eccentric being mounted upon the power-shaft $R^2$. $R^3$ is a belt-pulley secured to and adapted to actuate said shaft. Buffers or cushions $r$, secured to the lever C' or to the frame R, serve as means of engagement between said frame and lever.

B is the anvil, and C is the hammer.

Power is applied to the machine by a belt (not shown) passing around the pulley $R^3$ and receiving motion from a steam-engine or from other convenient source of power. The mechanical elements of the main hammer being thus set in motion, operate and are controlled in the usual manner.

The anvil B is provided with two faces perpendicular to each other, so that it is adapted to resist the vertical blows of the hammer C or the horizontal blows of the supplemental hammer D. These blows may be delivered simultaneously or alternately, as preferred; but it is most convenient to deliver said blows alternately, and they will be also most effective when so delivered.

The blow of the hammer may be delivered as a dead-blow or as an elastic blow, as preferred; but in the drawings the mechanism is elastic, being the ordinary steel-spring helve with a strap $s$ to actuate the hammer. The supplemental hammer D moves horizontally and is carried by a reciprocating head E, which moves in guides F. It is actuated by a reciprocating helve G, having an elastic connection with said head E similar to the helve connection shown in Fig. 1; but this is a matter of preference. A dead-blow hammer may be employed, if preferred.

The structure which may be employed to deliver an elastic blow with the supplemental hammer is shown in Fig. 3. G is a reciprocating helve, as in Fig. 1. It moves in guides H. A strong bow-string I is attached to the front of said helve, and the ends of this bow are connected by a strap J, under strong tension, by the resiliency of the spring I. The helve is caused to move by the leg K, attached to and carried by the lower husk L, which latter is attached to or forms a part of the frame R, hereinbefore referred to. The lower end of the leg K engages the helve of the supplemental hammer, as shown in section in Fig. 3, in rear view in Fig. 4, and by dotted lines in Figs. 1 and 2. It will be seen that by this construction the up-and-down oscillation of the main-hammer helve C' is accompanied by a forward-and-backward movement of the leg K, which is connected with said helve, and by a corresponding horizontal reciprocation of the supplemental hammer, which is connected with the leg. This arrangement will cause the hammers C D to alternate in their blows upon the bar under treatment; but it would be easy for any mechanic to substitute for the leg K mechanism to cause it to deliver the blow of the supplemental hammer simultaneously with the hammer C, if that were desirable. The same effects are produced in the helve-hammer shown in Fig. 2 by the same means. By these means the enlargement M of the welded bar, as shown in Fig. 5, may be reduced without delay in turning the bar on the anvil.

The leg K should have an adjustable connection with the helve G, and the same may be accomplished in various ways; but the way shown in the drawings, and particularly in Figs. 3 and 4, is practical. In this construction N N are rods projecting from and rigidly attached to the helve G, and a coupling-head P is mounted to slide upon said rods and be secured in position thereon by means of the clamps Q. The leg K passes through the coupling-head P and works therein. It may be provided with elastic cheek-pieces $R^5 R^5$ (shown in Fig. 3) or with a pivotal bearing S, as shown in Fig. 2.

I am also aware that Letters Patent No. 330,875, for a machine for welding tires, were issued to me November 24, 1885, in which machine there were two plungers moving in planes perpendicular to each other; but that invention differs from this in being incapable of delivering blows. It is a squeezing-machine and not a hammer.

Having described my invention, I claim as new—

1. In a power-hammer, the combination of an upright hammer C and a supplemental hammer D, which moves in a horizontal plane, with a corresponding two-faced anvil B, substantially as set forth.

2. The upright hammer C, the two-faced anvil B, and the horizontal hammer D, combined with the stationary guides F and H, the helves G and C', and the leg K, whereby the movement of the helve C' causes said hammers C D to move alternately toward the anvil, as set forth.

3. In a power-hammer, the lower husk L, provided with the leg K, combined with the helve G and hammer E, arranged to deliver a horizontal blow, as set forth.

4. In a power-hammer, the lower husk L, provided with the leg K, combined with the helve G, the coupling P, and the elastic cheek-pieces $R^5 R^5$, substantially as set forth.

5. In a power-hammer, the husk L, provided with a leg K, combined with the helve G, provided with one or more rods N, and the coupling P, adapted to be adjusted back or forth on said rods and rigidly secured in position thereon.

CHARLES M. COLLINS.

In presence of—
J. L. TAYLOR,
R. D. O. SMITH.